United States Patent [19]
Kunz

[11] 4,007,692
[45] Feb. 15, 1977

[54] BRAKING DEVICE FOR SLEDS FOR SLIDING PATHS
[75] Inventor: Manfred Kunz, Korbach, Germany
[73] Assignee: Continental Gummi-Werke Aktiengesellschaft, Hannover, Germany
[22] Filed: May 19, 1975
[21] Appl. No.: 579,020
[30] Foreign Application Priority Data
May 17, 1974 Germany .......................... 2424074
[52] U.S. Cl. .................................. 104/134; 188/8; 188/80; 188/262
[51] Int. Cl.² ........................................ A63G 21/00
[58] Field of Search ............. 188/5, 8, 39, 80, 262; 104/134; 280/12 AA, 12 AB
[56] References Cited
UNITED STATES PATENTS

| | | | |
|---|---|---|---|
| 1,107,256 | 8/1914 | Buckingham | 188/5 |
| 1,429,995 | 9/1922 | Abramchuk | 188/8 |
| 1,695,901 | 12/1928 | Quisling | 188/8 |

FOREIGN PATENTS OR APPLICATIONS

| | | | |
|---|---|---|---|
| 32,104 | 4/1927 | France | 188/5 |
| 242,810 | 1/1912 | Germany | 188/8 |
| 36,597 | 1/1923 | Norway | 188/8 |

Primary Examiner—Trygve M. Blix
Assistant Examiner—George E. A. Halvosa
Attorney, Agent, or Firm—Walter Becker

[57] ABSTRACT

A braking device for sleds, according to which rollers are used as braking elements which by means of an actuating element are moved from a non-braking position into a braking position while being pressed against the surface of the sliding path for the sled. According to a preferred design of the invention, pairs of rollers are employed with the rollers of each pair having different diameters.

2 Claims, 4 Drawing Figures

BRAKING DEVICE FOR SLEDS FOR SLIDING PATHS

The present invention relates to a braking device on sleds for sliding paths with a braking element adapted to be pressed against the surface of said path. Similar to the construction of the braking devices for bobsleds, also with slides or sleds for sliding paths or tracks, braking elements are pressed by lever means against the ground. However, instead of the braking prongs or teeth extending into the snow or the ice, braking blocks of a material having a high friction value, especially rubber, are employed which do not damage the surface of the path or track when disregarding a slow gradual wear by friction. The friction value between the braking block and the surface of the path and in addition thereto also the wear thereof is to a great extent influenced by the weather and the soiling. Inasmuch as the drop of a sliding path for purposes of obtaining sufficient speed is determined on the basis of a clean and dry path, with moist paths or tracks either by deposits or condensed water formation, frequently dangerous speeds occur. Experience has shown that the friction value may when the path is soiled or moist, be so low that the brakes no longer grip and thus no longer function.

It is, therefore, an object of the present invention to provide a braking device for larger slide paths which is nearly independent of the respective surface condition of the path and is also pressed only onto the path surface.

This object and other objects and advantages of the invention will appear more clearly from the following specification in connection with the accompanying drawing in which:

FIG. 1 diagrammatically illustrates a cross section of a sled equipped with a braking device according to the invention, said section being taken where the braking device is built in.

Figure 1:
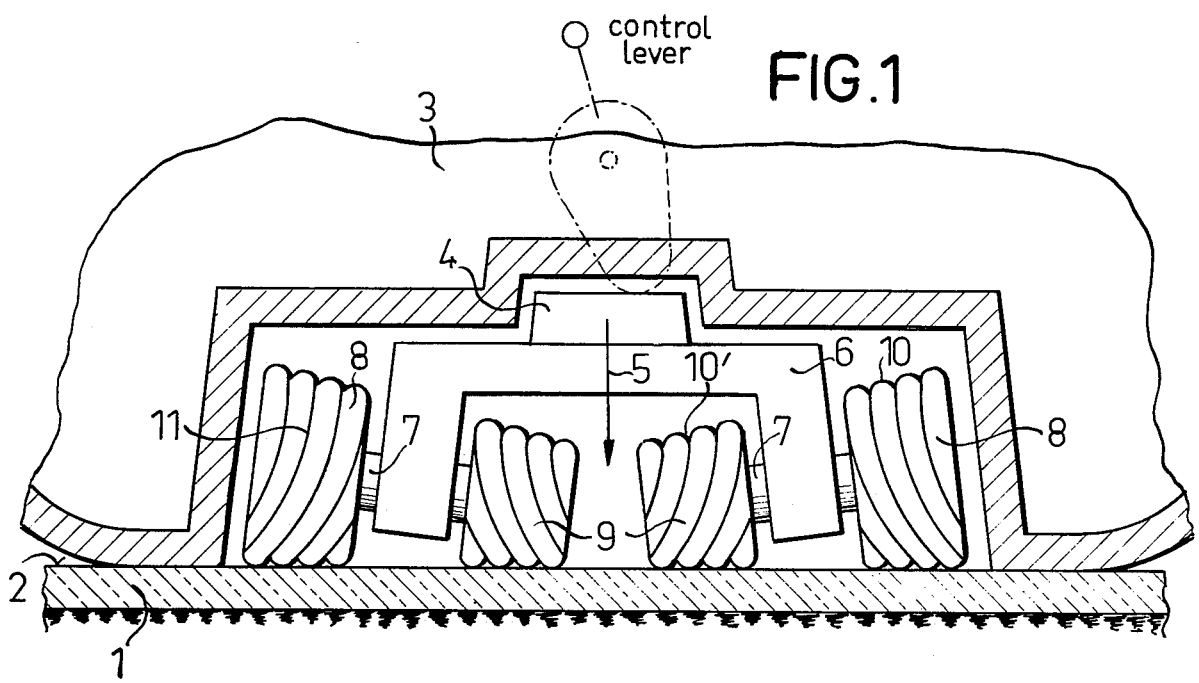

The braking device according to the present invention is characterized primarily in that the braking element forms a braked roller movable on the surface of the path or track.

The running surface of the roller is at rest relative to the surface of the path or track, which means that instead of the previous considerable sliding movement, a rolling occurs. In contrast to the heretofore known braking blocks, the roller surface which comes into contact with the path or track is continuously changed whereby a brakeable contact with the track or path is created. Outside its running surface the roller may be braked so that the frictional surfaces which are in frictional contact with each other will not be dependent on the respective condition of the track surface and will therefore be reliable at all times.

However, the braking effect may also be realized by keeping the rolling direction of the roller different from the sliding direction while an inclined or tilted roller or advantageously a roller with a conical running surface is employed.

A particularly economical braking device according to the invention consists in that the roller running on the surface of the path or track is pivotable about an axis which extends perpendicularly with regard to the sliding direction and is always adjustable as to its rolling direction at an incline or slope with regard to the sliding direction. As soon as the roller deviates with regard to its rolling direction from the sliding direction, a friction occurs which brakes the sled depending on the degree of the deviation. In this connection and with the other devices mentioned herein, it is to be noted that the difference between rolling direction and sliding direction does not amount to 90° in order to maintain the fundamental idea of the principle according to the invention with regard to the continuously changing source of contact between the roller and the path or track.

In order when the roller has been pivoted, to prevent the sled from wandering in lateral direction, advantageously 2 (,4,6, or more) rollers are arranged with a rolling device that is adapted to be placed in an inclined position symmetrically to the sliding direction.

A particularly advantageous solution of the above mentioned problem underlying the present invention consists primarily in that while employing a first roller which is braked by a second roller of a smaller diameter than, but is fixedly connected to said first roller is likewise movable on the surface of the track or path. In this way, the smaller or second roller is forced partially to slide because the difference in the roller distances has to be compensated for. Within the framework of the present invention it is advantageous when the second roller is variable in diameter and if this variation can be realized by means of materials adapted to be compressed. The diameter of the two rollers which are non-rotatably interconnected may thus without the effect of a load be equal, whereas when pressing the roller onto the surface of the path or track, the second roller will due to its elasticity decrease in diameter and will initiate the braking effect.

Whereas with the above described arrangement the first and the second roller are non-rotatably interconnected if desired also with joints or the like interposed therebetween, an expedient design consists in that a first and a second roller are rigidly interconnected by a rotatably mounted axle. Expediently, the running surfaces of the first and second roller are located in an imaginary conical mantle so that the running surfaces of the roller will over their entire width respectively engage the surface of the path or track in a linear manner. In order by this wide engagement to exclude the possibility of aquaplaning, the running surfaces are advantageously provided with annular or screwshaped ribs or grooves. The running surfaces, however, may also due to the arrangement of ribs or grooves in any desired arrangement be equipped with many slide preventing edges similar to a tread surface of a tire.

Referring now to the drawing in detail, sled 3 slides on the surface 2 of a sliding path 1, said sled being particularly in the rear section provided with a braking device. By means of a control system, illustrated only diagrammatically as cam and control lever, a brake arm 4 may be moved in the direction of the arrow 5 and in this connection presses a bearing yoke 6 downwardly which latter in each arm receives a rotatably mounted axle 7, and each of these axles has one end provided with a first roller 8 while its other end is provided with a second roller 9. The roller 9 has a shorter diameter than the roller 8. The rollers 8 and 9 have a conical running surface 10, 10', and are provided with grooves 11 so that the first roller 8 and the second roller 9 are together located in an imaginary conical mantle.

When the rollers 8 and 9 roll, due to the different diameters, a difference in the distance or stroke occurs which has to be compensated for by sliding on the surface 2 of the path 1. The running surfaces 10, 10' of the rollers 8,9 thus during a braking operation maintain continuously an intensive contact with the surface 2 while the sliding speed determined by the difference of the circumference of the rollers 8 and 9 is only indirectly influenced by the sliding speed of the sled 3.

Figure 2:
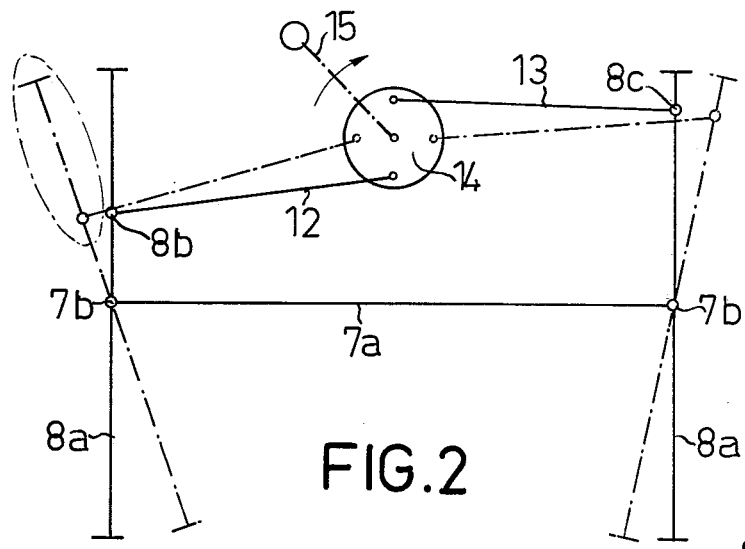
FIG. 2 is a diagrammatic illustration of a modified braking arrangement according to the invention.
Figure 3:
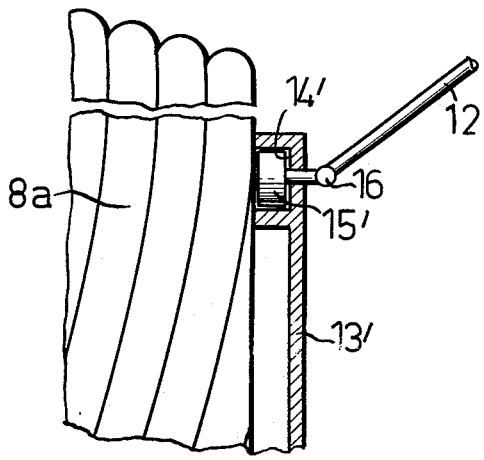
FIG. 3 shows the dot-dash encircled part of FIG. 2 in greater detail.

Referring now to FIG. 2, this figure diagrammatically illustrates a modification of the arrangement of FIG. 1, while making use of the same fundamental principle of FIG. 1. FIG. 2 shows an axle 7a having a pivotally connected to its ends at 7b wheels 8a which may have a cylindrical tread surface or may respectively have conical tread surfaces forming an image to each other. The wheels 8a are at 8b and 8c provided with a linkage system comprising connecting rods 12, 13 one end of which is connected to the respective adjacent wheel 8a whereas the other end of each connecting rod 12, 13 is pivotally connected to a control wheel 14 rotatable by a control lever 15. The connection of connecting rods 12, 13 with the wheels 8a may be of the type shown in FIG. 3, according to which the wheel 8a has a disc 13' connected thereto with a groove 14' which is movable relative to a roller 15' that is connected to the respective adjacent rod (in FIG. 3 to rod 12) through a joint 16.

Figure 4:
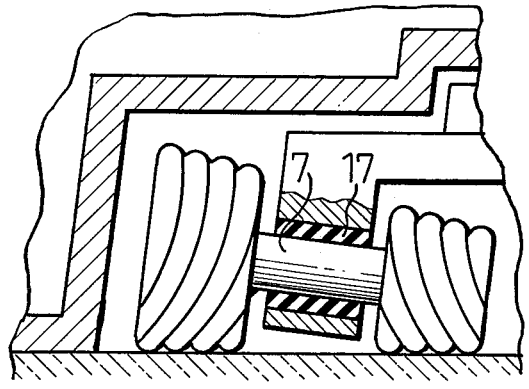
FIG. 4 shows a portion of FIG. 1 with additional friction means.

FIG. 4 shows a part of an arrangement similar to that of FIG. 1 but differing therefrom in that the axle 7 is journalled in a compessible rubber sleeve 17 for purposes of increasing the friction force on the axle or shaft 7 during the braking operation. It may be added that instead of increasing the braking force by the rubber sleeve 17, also a disc brake (not shown) may be used engaging a side of wheel 8a, or a jaw brake similar to those used in automobiles may in connection with a brake drum be associated with the respective wheel.

It is, of course, to be understood, that the present invention is, by no means, limited to the specific showing in the drawing but also comprises any modification within the scope of the appended claims.

What I claim is:

1. A braking device for use in connection with a sled for a sliding path, which includes in combination: braking means comprising roller means operable to engage the sliding path on which said braking device is to slide, and actuating means operatively connected to said roller means to move said roller means from a non-braking position into a braking position for braking engagement with the sliding path over which a sled equipped with said braking device is to slide, said roller means including at least two rollers and also including shaft means fixedly connected to said rollers, means operatively connected to said shaft means and operable to brake the latter to thereby brake said rollers, the central plane in the circumferential direction of said roller means differing from the desired normal direction of sliding of the sled to be equipped with said braking device, said roller each having a conical running surface, said shaft means including an axle with said two rollers respectively pivotally connected to the two ends of said axle for respectively pivoting about an axis extending in the intended sliding direction of the sled equipped with said braking device, and said actuating means being operatively connected to said two rollers and being operable simultaneously to tilt said two rollers in opposite direction relative to each other about said axes.

2. In combination with a sled slidable on a sliding path, a braking device, which includes two pairs of rollers arranged symmetrically with regard to the longitudinal plane of symmetry of said sled, each of said pairs of rollers comprising a first conical roller and a second conical roller having a shorter diameter than said first roller, two shafts respectively associated with said pairs of rollers, and each of said shafts rigidly interconnecting the pertaining rollers, supporting means supporting said shafts, actuating means operatively connected to said supporting means and operable to move said pairs of rollers from an elevated non-braking position downwardly into a braking position for frictional engagement with the sliding path over which a sled equipped with said braking device is to slide, and means associated with said rollers and operable to tilt said rollers relative to the intended sliding direction of the sled to be equipped with said braking device, said rollers being pivotable about an axis substantially perpendicular to the intended sliding direction of the sled to be equipped with said braking device and being movable into a position inclined to said sliding position.

* * * * *